(12) United States Patent
Luan

(10) Patent No.: US 7,354,870 B2
(45) Date of Patent: Apr. 8, 2008

(54) PROCESS FOR CHEMICAL ETCHING OF PARTS FABRICATED BY STEREOLITHOGRAPHY

(75) Inventor: Benli Luan, London (CA)

(73) Assignee: National Research Council of Canada, Ottawa (CA)

(*) Notice: Subject to any disclaimer, the term of this patent is extended or adjusted under 35 U.S.C. 154(b) by 156 days.

(21) Appl. No.: 11/272,098

(22) Filed: Nov. 14, 2005

(65) Prior Publication Data

US 2007/0108664 A1   May 17, 2007

(51) Int. Cl.
H01L 21/302 (2006.01)

(52) U.S. Cl. .................. 438/745; 438/750; 216/83

(58) Field of Classification Search ............. 438/745, 438/750, 752; 216/83, 87
See application file for complete search history.

(56) References Cited

U.S. PATENT DOCUMENTS

| | | | |
|---|---|---|---|
| 5,015,339 A | 5/1991 | Pendleton | |
| 5,112,513 A | 5/1992 | Bressel et al. | |
| 5,198,096 A | 3/1993 | Foust et al. | |
| 5,213,840 A | 5/1993 | Retallick et al. | |
| 5,229,169 A | 7/1993 | Chao | |
| 2003/0039754 A1 | 2/2003 | Konigshofen | |
| 2004/0096584 A1* | 5/2004 | Naruskevicius et al. | 427/306 |
| 2006/0091780 A1* | 5/2006 | Minami | 313/495 |
| 2006/0231927 A1* | 10/2006 | Ohno | 257/621 |
| 2006/0264526 A1* | 11/2006 | Klare et al. | 522/84 |

FOREIGN PATENT DOCUMENTS

| | | |
|---|---|---|
| CA | 1007523 | 3/1977 |
| CA | 1228513 | 10/1987 |
| CA | 1254493 | 5/1989 |
| CA | 2020624 | 1/1991 |
| CA | 2023846 | 2/1991 |
| CA | 2031422 | 2/1991 |
| CA | 1299935 | 5/1992 |
| CA | 1306409 | 8/1992 |
| CA | 1334924 | 3/1995 |
| CA | 2350422 | 5/2000 |
| CA | 2437105 | 11/2002 |

OTHER PUBLICATIONS

Enplate PC-236 Technical Data Sheet. (Enthone-OMI, Inc., New Haven) Jun. 15, 1983.

(Continued)

*Primary Examiner*—Lan Vinh
(74) *Attorney, Agent, or Firm*—Hans Koenig

(57) ABSTRACT

A process for chemically etching a stereolithography resin involves chemically etching a shaped object of the resin at a temperature in a range of from about 20° C. to about 30° C. for a time of from about 30 seconds to about 60 seconds with a saturated aqueous solution of permanganate, for example potassium permanganate. The process is faster, simpler and uses less environmentally harmful chemicals than previous etching processes for SLA parts. Etching is also more thorough and can reach hard to access places that sand blasting cannot. The etching process may be part of a process for metallization of a rapid prototyping part fabricated by stereolithography. Excellent etch coverage leads excellent coverage by the coating metal and to stronger metal layers.

16 Claims, 1 Drawing Sheet

OTHER PUBLICATIONS

Enplate Activator 444 Technical Data Sheet. (Enthone-OMI, Inc., New Haven) Jan. 25, 1996.

Enplate PA-493Technical Data Sheet. (Enthone-OMI, Inc., New Haven) Aug. 28, 1996.

Enplate CU-406 Technical Data Sheet. (Enthone-OMI, Inc., New Haven) Jul. 5, 1995.

Luan, B., et al. Applied Surface Science. 156 (2000) pp. 26-38.

* cited by examiner

PROCESS FOR CHEMICAL ETCHING OF PARTS FABRICATED BY STEREOLITHOGRAPHY

FIELD OF THE INVENTION

The present invention relates to a process for chemically etching parts fabricated by stereolithography (SLA) and to a process for metallization of rapid prototyping parts fabricated by stereolithography (SLA).

BACKGROUND OF THE INVENTION

Stereolithography is a relatively new technology linking the power of computer graphics to the rapid formation of a solid, shaped object. This technology uses UV laser to selectively solidify successive thin layers of a photo-curable resin and provides great economies for both the design lab and the modeling process. Since the invention of stereolithography in 1984, this technology has enabled a new method for rapid prototyping (RP), appearing in 1988, which allows designers to verify their product design at an early stage by using 3D representations for design review with sales, marketing and production engineers. However, many of these systems produce only fragile parts, which can only be used for form and fit analysis and are not suitable for any other function.

In 1995, a technology was developed to deposit metals onto the surfaces of non-metallic RP parts, particularly SLA parts. Of all the available metallization processes, such as electroless deposition, physical vapor deposition (PVD) and chemical vapor deposition (CVD), the former is the most applicable for SLA parts due to its possession of combined characteristics such as uniformity, simple operation, low cost and no damage to the substrate.

In order to apply electroless deposition to a non-catalytic surface, the surface must be subjected to a series of pre-treatment steps such as pickling, sensitization and activation. Of all the three pre-treatment processes, pickling is the most important process that provides the substrate with cavities, and in some cases a modified chemistry, which improve the adherence of coating. There are two ways to pickle the surface: sand blasting/glass beading, and chemical etching.

Sand blasting process uses a stream of high-pressure sand of certain size to bombard the substrate surface thereby creating cavities. The advantage of this process is its independence of substrate materials. However, sand blasting has disadvantages such as non-uniform surface preparation, lack of consistency (dependency of the operator's skill level), time consuming (particularly for large parts), and most importantly, inability to prepare features that the sand stream cannot access, such as deep cavities.

Chemical etching is a commonly known pickling process that has been successfully applied to numerous types of polymers such as ABS. The disadvantage of chemical etching is that the process is dependent on the composition of the substrate. Thus, not all types of polymers may be successfully chemically etched and a chemical etchant for one polymer may not work for another. SLA polymers have very different chemical compositions than other polymers, therefore it is not a priori obvious that a particular etching process for one polymer would be useful for SLA polymers. However, chemical etching has advantages over sand blasting, for example uniformity, consistency, short preparation time for small and large parts, and ability to treat complex shapes. Therefore, it would be useful to have a chemical etchant for SLA polymers.

Currently, chemical etching of SLA parts in a coating process is not used commercially, though it is much needed. One process for chemically etching SLA parts was reported by Luan et al. in *Applied Surface Science*, 156: 26-38 (2000) and involves chromic acid. Chromic acid is environmentally unfriendly and the process is very complicated both in terms of the chemical composition and in terms of operation. Further, this process often damages the part. Furthermore, this process provides grooves and trenches in the surface of the SLA part but not much etching between the grooves and trenches. As a result, there is inconsistent coverage of the coating material on the SLA part, leading to weaker parts that are less useful in the rapid prototyping industry.

Other standard chemical etchants known in the art, for example $H_2SO_4$/HF used to etch epoxy polymers, do not work effectively for SLA polymers. Currently, there is no suitable way to effectively etch SLA polymers chemically.

There remains a need for a functional, simple and more environmentally friendly chemical etching process for coating of SLA polymers.

SUMMARY OF THE INVENTION

Heretofore, it has been believed that a stronger etchant would be necessary for cured SLA resins since surface wettability of SLA resins is so poor. SLA resins have a significant proportion of epoxy resin, which would normally lead to the use of HF as an etchant since HF is commonly used to etch epoxy resins. However, as mentioned previously, HF does not work effectively for SLA resins. Suprisingly, it has now been found that chemically etching SLA resins may be effectively accomplished under mild conditions with a saturated aqueous solution of permanganate.

Thus, there is provided a process for chemically etching a stereolithography resin comprising: providing an entirely solid shaped object comprising an epoxy-containing stereolithography resin; and, chemically etching the shaped object at a temperature in a range of from about 20° C. to about 30° C. for a time of from about 30 seconds to about 60 seconds with an etchant consisting essentially of a saturated aqueous solution of permanganate.

There is also provided a process for metallization of a rapid prototyping part fabricated by stereolithography, the process comprising: providing a liquid photosensitive epoxy-containing stereolithography resin; selectively solidifying the resin by irradiating selected regions of the resin with a laser to produce a shaped object; chemically etching the shaped object at a temperature in a range of from about 20° C. to about 30° C. for a time of from about 30 seconds to about 60 seconds with an etchant consisting essentially of a saturated aqueous solution of permanganate; and, metallizing the etched shaped object by electroless deposition.

Processes of the present invention provide a number of advantages, including low capital investment, low energy consumption, excellent scalability with low scale-up cost, simple operation and controls, short processing time, and better environmental friendliness. The etching process provides more thorough and uniform etching leading to more even coverage by the metal coating and to more thorough coating of hard to access regions of the objects. Further, the etching process of the present invention ultimately provides better adhesion of the coating to the object.

In SLA processes, polymeric rapid prototype parts are created from a vat of liquid photosensitive resin by selectively solidifying the resin (spot polymerization) with a scanning laser beam (UV or visible). One form of stereolithographic apparatus uses a photosensitive liquid resin, an x-y scanning ultra-violet laser beam with a 0.25 mm beam diameter, and a z-axis elevator platform in the vat. The laser beam is focussed on and directed over the liquid's surface on a path determined from layer information and solidifies (cures) the resin, making solid forms wherever the beam is scanned. Depth of the cure is dosage-dependent, i.e. dependent upon the laser energy deposited in the spot of illumination. The path is controlled by moving the laser beam at a speed determined by its spot size and power, and the depth of the slice set by the computer model.

The elevator platform is initially positioned at the surface, and as the laser draws a cross-section in the x-y plane, a solid layer is formed on the elevator platform. The solid layer may be tethered to prevent lateral movement in order to prevent mis-registering subsequent layers. Thus, the layer formed on the surface of the liquid is supported in position. The elevator is then lowered a distance corresponding to thickness of the next layer to be formed, and another solid layer is formed on the first. Alternatively, the liquid polymer may be raised and the platform held stationary.

The process is repeated to produce a solid object rising from the elevator platform. For each layer, laser speed is adjusted to polymerize the desired depth plus an additional amount needed to adhere the polymer to the layer beneath. Excess liquid is then drained away from the solid, and the solid is cleaned and prepared for use by the designer. To save time, it may be preferred not to fully cure each layer, but to fully cure only the outline of each cross-section and the whole of the bottom and top layers. The internal volume can then be cured subsequently under ultra-violet light to form an entirely solid object.

The precise chemical composition of commercially available SLA resins is often proprietary. However, it is generally known that SLA resins contain epoxy groups. More particularly, SLA resins may comprise one or more cycloaliphatic epoxy resins. A particularly exemplified SLA resin comprises cycloaliphatic epoxy resin, aliphatic glycidyl ether, polyols, modified acrylate ester, acrylate ester and photo-curing agent. Some commercially available SLA polymers include the Accura SL materials from 3D Systems, for example Accura SI10, Accura 40, etc.

While SLA processes provide an economical and rapid way of producing a polymeric prototype of a part, such parts are generally fragile due to the nature of the polymeric material, and cannot be tested in an apparatus as though they were functional parts. For this reason, it is desirable to metallize SLA parts, particularly when the parts are to be used in fabricating a rapid prototype.

In order to metallize SLA parts, it is necessary to first pickle the surface of the shaped object produced by the SLA process. In the present invention, pickling is accomplished by chemically etching the shaped object.

Chemically etching the shaped object is accomplished with a saturated aqueous solution of permanganate. Preferably, the permanganate is an alkali metal permanganate, more preferably sodium or potassium permanganate, most preferably potassium permanganate. The solubility of permanganate in water is very temperature dependent. For example, at 20° C. potassium permanganate has a solubility in distilled water of 65.0 g/l, while at 40° C. the solubility is 125.2 g/l and at 60° C. the solubility is 230.0 g/l. However, saturated aqueous permanganate solutions may be easily obtained and maintained by adding an excess of permanganate to water such that solid permanganate is always visible.

The saturated aqueous solution of permanganate does not contain any other components that significantly affect the operation of the etching solution. For example, the solution does not contain any additional acid or base, thus the pH of the solution is relatively neutral, generally being in a range of from about 6 to about 8. The presence of other chemical etchants are not desired or required.

Chemical etching conditions for a process of the present invention are mild. Etching is conducted at a temperature in a range from about 20° C. to about 30° C., more particularly about 25° C. to about 30° C., even more particularly about 25° C., for a time of from about 30 seconds to about 60 seconds, more particularly from about 30 seconds to about 45 seconds.

Sample handling during chemical etching can ultimately affect coating performance. Preferably, the shaped object is oscillated in an etch bath for the first few seconds of etching then held still in the etch bath for the remainder of the etching process. Not oscillating the object for the first few seconds can lead to poorer metal deposition during metallization. Oscillating the object throughout the etching process can lead to blistering of the coating.

After etching, the object may be rinsed with a rinse medium to remove the etching solution. Rinsing is preferably accomplished with water, more preferably distilled water. The conditions under which the object is rinsed may affect the overall effectiveness of the metallization process. The rinse medium is preferably used at a temperature in a range of from about 20° C. to about 75° C., more preferably at about 50° C., for a period of time preferably in a range of from about 10 seconds to about 60 seconds, more preferably about 30 seconds.

Before metallizing the etched shaped object, it may be desirable, although not necessary, to subject the object to sensitization and/or activation. Sensitization and activation of substrates is well known in the art and any number of known solutions may be used. Sensitization (pre-activation) may be accomplished by treating the part with an aqueous solution of stannous ions. Such sensitizers include, for example, acidic solutions (e.g. stannous chloride in hydrochloric acid) and alkaline solutions (e.g. stannous chloride with sodium hydroxide and potassium sodium tartrate). Activation may be accomplished by treating the part with aqueous solutions of precious metal ions (e.g. palladium, platinum, gold, silver, rhodium, osmium or iridium).

After etching, or after sensitization/activation, the object is metallized by electroless deposition. Electroless deposition is a generally known technique involving treating the object in an aqueous solution of electroless metal ions, for example copper, nickel, gold, silver and metal alloys (e.g. Ni—Fe—P, Ni—Co—P and Ni—W—P). Such solutions are capable of autocatalytically depositing the metal on the surface of the object without the use of electricity.

Sensitization (pre-activation), activation and electroless deposition solutions are available commercially. For example, the Enplate™ series of solutions from Enthone-OMI Inc. may be used to sensitize and activate the SLA part and then metallize the part with copper by electroless deposition. Other suppliers of commercially available solutions are Atotech Canada Ltd. and Macdermid Inc.

Electroless deposition provides a relatively thin (e.g. about 1-2 μm) layer of a metal on the surface of the SLA part. In order to make the metal coating thicker and more robust, the metallized part may be further subjected to electroplating. The metal coated on the part by electroplating may be the same or different as the metal deposited by electroless deposition. Electroplating strengthens the metal layer. Good coverage by electroless deposition leads to stronger coating when electroplating. Thus, the etching process of the present invention, which provides a thorough and even etching of the surface of the SLA part, leads to excellent coverage by electroless deposition, which in turn leads to stronger coatings by electroplating. The resulting part is therefore strong and excellently useful in fabricating rapid prototypes.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Figure 1:
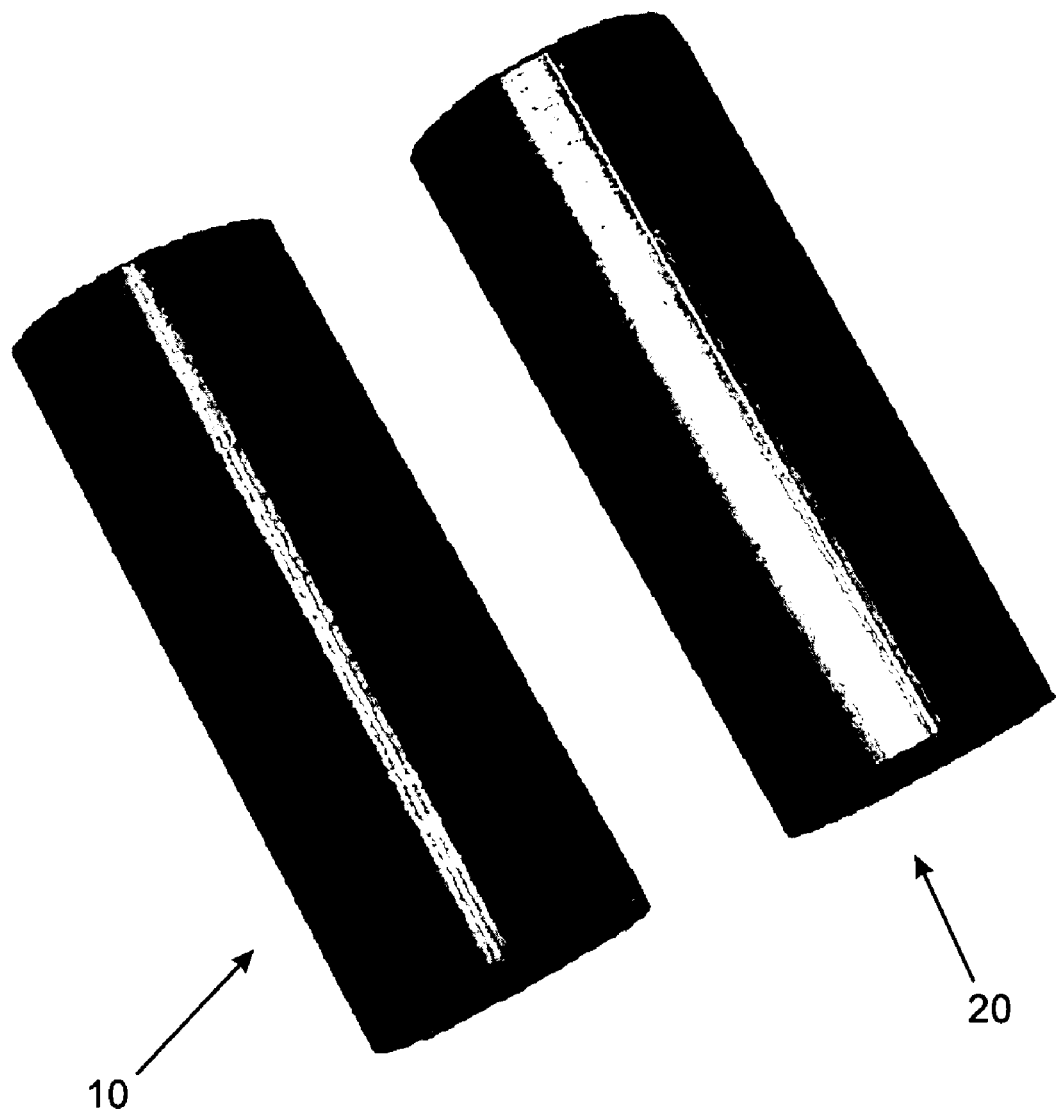
FIG. 1 is a photograph of an uncoated and a coated cylindrical SLA part.

Hollow cylindrical SLA parts were fabricated from SL5195 SLA resin provided by 3D Systems using standard SLA techniques. The cylindrical SLA parts were subjected to chemical etching and metallization as described below.

For particularly dirty or greasy parts, the parts may be first cleaned/degreased with a cleaning solution (e.g. Sparkleen™ from Fisher Scientific). For relatively clean parts, or after cleaning with a cleaning solution, the parts are rinsed with deionized water before chemical etching.

Chemical etching of each part was accomplished by immersing the part in a saturated aqueous solution of potassium permanganate of Analytical Reagent grade (supplied by Aldrich-Sigma). De-ionized water was used to prepare the etching solution. Saturation was ensured by maintaining the presence of solid potassium permanganate in the solution. The part was oscillated in the etching solution for the first few seconds of etching then held still in the etch solution for the remainder of the etching process. After etching, the parts were rinsed with deionized water.

A commercially available electroless deposition process was used to investigate the effect of etching. The Enplate™ series of solutions (from Enthone-OMI, Inc.) was used according to the instructions supplied with the solutions. For pre-activation, the part was immersed in Enplate™ PC-236. For activation, the part was then immersed in Enplate™ PC-444. The part was then thoroughly rinsed with deionized water. For post-activation, the part was then immersed in Enplate™ PA-493. The part was then thoroughly rinsed with deionized water. For electroless deposition, the part was then immersed in Enplate™ Cu-406. After electroless deposition, the part was thoroughly rinsed with deionized water followed by isopropyl alcohol, and then air dried.

Identification of optimal etching conditions was based on assessment of the following examples with respect to surface coverage.

Example 1

| Step | Temperature | Time |
| --- | --- | --- |
| Etching | 80° C. | 10 sec |
| Pre-Activation | 80° F. | 3 min |
| Activation | 87° F. | 7 min |
| Post-Activation | 80° F. | 1 min 30 sec |
| Plating (Cu-406) | 30° C. | 1 min 30 sec |

Example 2

| Step | Temperature | Time |
| --- | --- | --- |
| Etching | 40° C. | 30 sec |
| Pre-Activation | 80° F. | 3 min |
| Activation | 87° F. | 7 min |
| Post-Activation | 80° F. | 1 min 30 sec |
| Plating (Cu-406) | 30° C. | 1 min 30 sec |

Example 3

| Step | Temperature | Time |
| --- | --- | --- |
| Etching | 50° C. | 30 sec |
| Pre-Activation | 80° F. | 3 min |
| Activation | 87° F. | 7 min |
| Post-Activation | 80° F. | 1 min 30 sec |
| Plating (Cu-406) | 30° C. | 1 min 30 sec |

Example 4

| Step | Temperature | Time |
| --- | --- | --- |
| Etching | 50° C. | 5 sec |
| Pre-Activation | 80° F. | 3 min |
| Activation | 87° F. | 7 min |
| Post-Activation | 80° F. | 1 min 30 sec |
| Plating (Cu-406) | 30° C. | 1 min 30 sec |

Example 5

| Step | Temperature | Time |
| --- | --- | --- |
| Etching | 20° C. | 60 sec |
| Pre-Activation | 80° F. | 3 min |
| Activation | 87° F. | 7 min |
| Post-Activation | 80° F. | 1 min 30 sec |
| Plating (Cu-406) | 30° C. | 1 min 30 sec |

Example 6

| Step | Temperature | Time |
|---|---|---|
| Etching | 25° C. | 20 sec |
| Pre-Activation | 80° F. | 3 min |
| Activation | 87° F. | 7 min |
| Post-Activation | 80° F. | 1 min 30 sec |
| Plating (Cu-406) | 30° C. | 1 min 30 sec |

Example 7

| Step | Temperature | Time |
|---|---|---|
| Etching | 25° C. | 30 sec |
| Pre-Activation | 80° F. | 3 min |
| Activation | 87° F. | 7 min |
| Post-Activation | 80° F. | 1 min 30 sec |
| Plating (Cu-406) | 30° C. | 1 min 30 sec |

Example 8

| Step | Temperature | Time |
|---|---|---|
| Etching | 25° C. | 40 sec |
| Pre-Activation | 80° F. | 3 min |
| Activation | 87° F. | 7 min |
| Post-Activation | 80° F. | 1 min 30 sec |
| Plating (Cu-406) | 30° C. | 1 min 30 sec |

Example 9

| Step | Temperature | Time |
|---|---|---|
| Etching | 25° C. | 50 sec |
| Pre-Activation | 80° F. | 3 min |
| Activation | 87° F. | 7 min |
| Post-Activation | 80° F. | 1 min 30 sec |
| Plating (Cu-406) | 30° C. | 1 min 30 sec |

Example 10

| Step | Temperature | Time |
|---|---|---|
| Etching | 25° C. | 60 sec |
| Pre-Activation | 80° F. | 3 min |
| Activation | 87° F. | 7 min |
| Post-Activation | 80° F. | 1 min 30 sec |
| Plating (Cu-406) | 30° C. | 1 min 30 sec |

Example 11

| Step | Temperature | Time |
|---|---|---|
| Etching | 25° C. | 30 sec |
| Pre-Activation | 80° F. | 3 min |
| Activation | 87° F. | 2 min |
| Post-Activation | 80° F. | 30 sec |
| Plating (Cu-406) | 22° C. | 2 min |

Example 12

| Step | Temperature | Time |
|---|---|---|
| Etching | 25° C. | 30 sec |
| Pre-Activation | 80° F. | 3 min |
| Activation | 87° F. | 3 min |
| Post-Activation | 80° F. | 40 sec |
| Plating (Cu-406) | 22° C. | 1 min 30 sec |

Example 13

| Step | Temperature | Time |
|---|---|---|
| Etching | 25° C. | 30 sec |
| Pre-Activation | 80° F. | 3 min |
| Activation | 87° F. | 4 min |
| Post-Activation | 80° F. | 52 sec |
| Plating (Cu-406) | 22° C. | 1 min |

Example 14

| Step | Temperature | Time |
|---|---|---|
| Etching | 25° C. | 30 sec |
| Pre-Activation | 80° F. | 3 min |
| Activation | 87° F. | 5 min |
| Post-Activation | 80° F. | 65 sec |
| Plating (Cu-406) | 22° C. | 1 min |

Example 15

| Step | Temperature | Time |
|---|---|---|
| Etching | 25° C. | 30 sec |
| Pre-Activation | 80° F. | 3 min |
| Activation | 87° F. | 6 min |
| Post-Activation | 80° F. | 78 sec |
| Plating (Cu-406) | 22° C. | 1 min |

Example 16

| Step | Temperature | Time |
| --- | --- | --- |
| Etching | 25° C. | 30 |
| Pre-Activation | 80° F. | 3 min |
| Activation | 87° F. | 9 min |
| Post-Activation | 80° F. | 1 min 40 sec |
| Plating (NRC) | 35.5° C. | 5 min |

Based on results from the examples above, orthogonal design was conducted to identify preferred operating conditions. It was found that for temperature and etching duration, preferred ranges were 25-30° C. and 30-60 seconds, respectively. The best conditions were identified as 25° C. and 30-45 seconds etching in a saturated potassium permanganate solution.

Also, after etching, it was found that rinsing the part in deionized water at room temperature for 15 seconds and then for 30 seconds at 50° C. was preferred.

Results for experiments conducted in the preferred ranges are shown in Table 1. The experiments conducted for Table 1 involved: providing a fully cured SLA part; cleaning the SLA part in Sparkleen™ if necessary; rinsing the part thoroughly with deionized water; etching the part in saturated aqueous potassium permanganate; rinsing the part in deionized water at room temperature for 15 seconds and then for 30 seconds at 50° C.; immersing the part in the pre-activator solution for 3 minutes; immersing the part in the activator solution for 7 minutes; thoroughly rinsing the part with deionized water; immersing the part in the post-activator solution for 1.5 minutes; thoroughly rinsing the part with deionized water; immersing the part in the electroless deposition solution for 1.5 minutes; thoroughly rinsing the part with deionized water and then isopropyl alcohol; and air drying the part. Results were assessed based on coverage of the metal on the part.

TABLE 1

| Temp (° C.) | Etch Time (s) | Coverage |
| --- | --- | --- |
| 20 | 30 | good coverage - small void |
| 20 | 45 | small peel on smooth surface |
| 20 | 60 | peeling on smooth surface |
| 25 | 30 | good coverage - slight voids |
| 25 | 45 | good coverage - slight small void |
| 25 | 45 | good coverage - few voids |
| 25 | 45 | good coverage - few voids |
| 25 | 60 | good coverage - few voids |
| 30 | 30 | voids on smooth surface |
| 30 | 45 | large voids on smooth surface |
| 30 | 60 | large voids on smooth surface |

FIG. 1 is a photograph showing an uncoated cylindrical SLA part 10 and a coated cylindrical SLA part 20. Coated part 20 was chemically etched in accordance with the present invention, coated with copper by electroless deposition, then top coated with electroless Ni—P alloy. Both the outside and inside of coated part 20 is coated. This cannot be achieved using conventional sand blasting pre-treatment, in which case the inside is difficult to coat, if at all possible.

Example 17

Effect of Potassium Permanganate (KMnO$_4$) Concentration

SLA parts made from Accura SI10 SLA polymer were etched in saturated and unsaturated (15 g/l) aqueous KMnO$_4$ to determine the effect of KMnO$_4$ concentration on etching performance.

A total of twenty trials were performed. The conditions of each trial and the results are shown in Table 2. Each trial used fresh solutions. For each trial, a fully cured SLA part was soaked in a Sparkleen™ solution, rinsed thoroughly with water, and immersed in the KMnO$_4$ etching solution stirred with a Corning 420 magnetic stirrer at setting #7. Each part was etched at the temperature and for the time indicated in Table 2. After etching, each part was rinsed in deionized water at room temperature and then in hot water at 50° C. After rinsing, each part was immersed in Enplate™ PC-236 pre-activator solution and then in Enplate™ PC-444 activator solution for the appropriate amount of time. Each part was then thoroughly rinsed with water and immersed in Enplate™ PA-493 post-activator solution for appropriate amount of time. Each part was then thoroughly rinsed with water and immersed in Enplate™ Cu-406 electroless deposition for the appropriate amount of time. Finally, each part was rinsed with water, then with deionized water, and air dried.

TABLE 2

| | 15 g/l KMnO$_4$ | | Saturated KMnO$_4$ | |
| --- | --- | --- | --- | --- |
| Time | 20° C. | 30° C. | 20° C. | 30° C. |
| 30 s | voids, bright coating | voids, bright coating | bright coating | bright coating |
| 60 s | voids, bright coating | voids, bright coating | bright coating | small voids, bright coating |
| 180 s | voids, bright coating | voids, bright coating | voids, bright coating | large void, bright coating |
| 300 s | voids, bright coating | voids, bright coating | blisters, bright coating | large void, bright coating |
| 600 s | large void, bright coating | large void, bright coating | bright coating | large void, bright coating |

Results were assessed based on coverage of the copper on the coated part. The coated parts in all of the trials had some small blisters, probably due to the very thin copper coating. The saturated solution at 30° C. showed the least blistering.

It is evident from the results that etching with unsaturated solutions of KMnO$_4$ result in poor coverage (more or larger voids) at all temperatures and times. Therefore, merely using a less concentrated solution of KMnO$_4$ for a longer period of time does not provide the same result as using a saturated solution KMnO$_4$ for 30 to 60 seconds. Etching conducted at lower concentrations results in large voids on the coated surface as compared to parts etched using a saturated solution.

Other advantages which are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A process for chemically etching a stereolithography resin comprising: providing an entirely solid shaped object comprising an epoxy-containing stereolithography resin; and, chemically etching the shaped object at a temperature in a range of from 20° C. to 30° C. for a time of from 30 seconds to 60 seconds with an etchant consisting essentially of a saturated aqueous solution of permanganate.

2. The process of claim 1, wherein the temperature is in a range from 25° C. to 30° C.

3. The process of claim 1, wherein the temperature is about 25° C.

4. The process of claim 1, wherein the time is from 30 seconds to 45 seconds.

5. The process of claim 1, wherein the permanganate is potassium permanganate.

6. The process of claim 1, wherein the resin comprises one or more cycloaliphatic epoxy resins.

7. The process of claim 1, wherein the resin comprises one or more cycloaliphatic epoxy resins, the permanganate is potassium permanganate, the temperature is about 25° C., and the time is from 30 seconds to 45 seconds.

8. A process for metallization of a rapid prototyping part fabricated by stereolithography, the process comprising:
  (a) providing a liquid photosensitive epoxy-containing stereolithography resin;
  (b) selectively solidifying the resin by irradiating selected regions of the resin with a laser to produce a shaped object;
  (c) chemically etching the shaped object at a temperature in a range of from 20° C. to 30° C. for a time of from 30 seconds to 60 seconds with an etchant consisting essentially of a saturated aqueous solution of permanganate; and,
  (d) metallizing the etched shaped object by electroless deposition.

9. The process of claim 8, wherein the shaped object is not entirely solid after selectively solidifying the resin with the laser, and wherein the not entirely solid shaped object is completely solidified by curing before chemical etching.

10. The process of claim 8, wherein the temperature is in a range from 25° C. to 30° C.

11. The process of claim 8, wherein the temperature is about 25° C.

12. The process of claim 8, wherein the time is from 30 seconds to 45 seconds.

13. The process of claim 8, wherein the permanganate is potassium permanganate.

14. The process of claim 8, wherein the resin comprises one or more cycloaliphatic epoxy resins.

15. The process of claim 8, further comprising rinsing the solid object with water at 50° C. for 30 seconds after the object has been etched and before metallizing the object.

16. The process of claim 8, wherein the resin comprises one or more cycloaliphatic epoxy resins, the permanganate is potassium permanganate, the temperature for etching is about 25° C., and the time for etching is from 30 seconds to 45 seconds, and the solid object is rinsed with deionized water at 50° C. for 30 seconds after the object has been etched and before metallizing the object.

* * * * *